March 20, 1928.

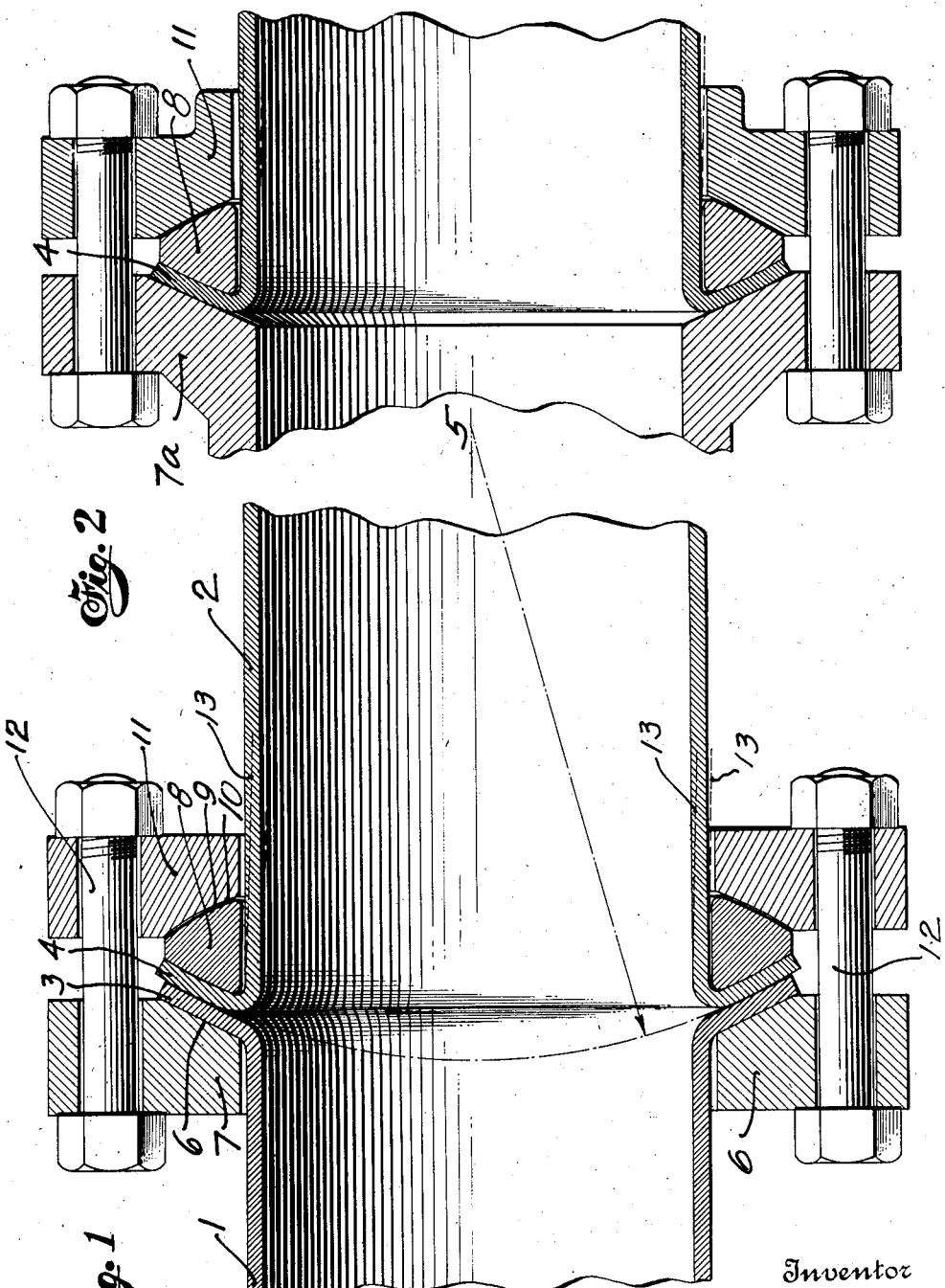

B. BROIDO

PIPE JOINT

Filed July 10, 1922

1,662,954

3 Sheets-Sheet 2

Inventor
Benjamin Broido
By his Attorney
O. V. Thiele

March 20, 1928. 1,662,954
B. BROIDO
PIPE JOINT
Filed July 10, 1922 3 Sheets-Sheet 3
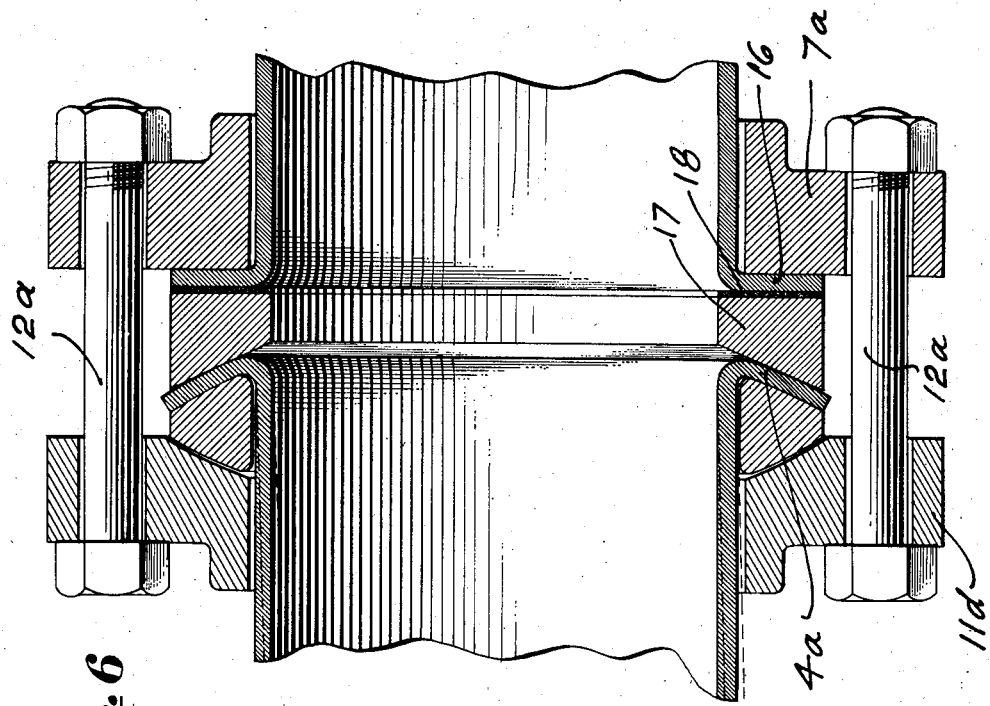
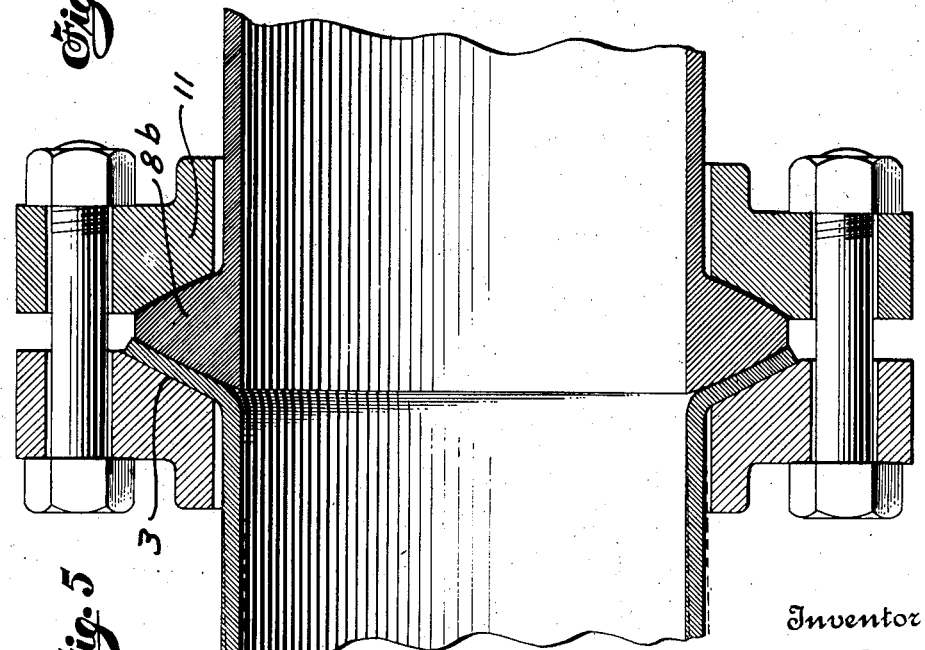
Inventor
Benjamin Broido
By his Attorney
O. V. Thiele Patented Mar. 20, 1928.

1,662,954

UNITED STATES PATENT OFFICE.

BENJAMIN BROIDO, OF NEW YORK, N. Y.; ANNA G. FREEDMAN BROIDO AND THE NATIONAL CITY BANK OF NEW YORK ADMINISTRATORS OF SAID BENJAMIN BROIDO, DECEASED.

PIPE JOINT.

Application filed July 10, 1922. Serial No. 573,789.

My invention relates to the well-known class of pipe joints of which the one known as the Van Stone joint is typical, and has for its purpose the provision of improved form of such a joint whereby a tight and readily demountable joint is effected which will permit some deviation from exact alinement of the pipes and have certain other advantages appearing more fully in the description which follows. The invention refers particularly to the joining of pipes of relatively large diameter, which are made of steel or other material permitting the flanging of the pipes.

Figure 4:
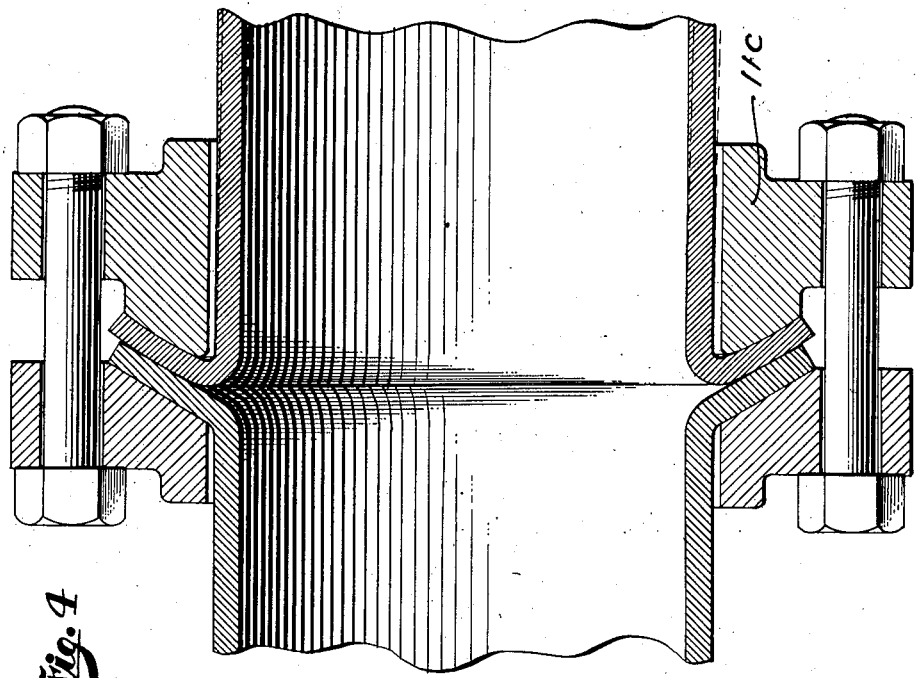
Figure 3:
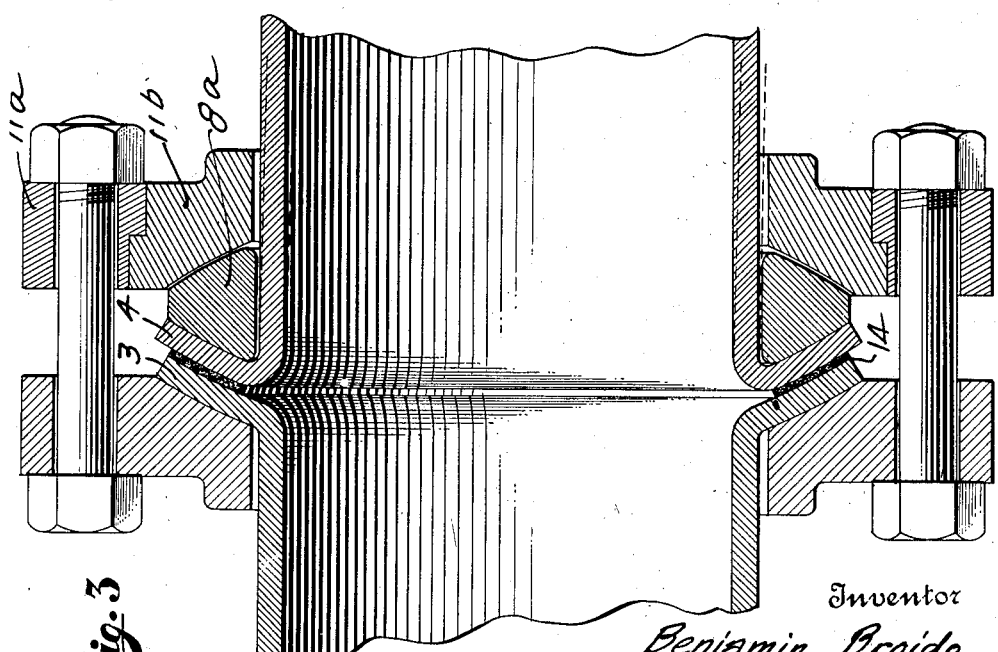

I illustrate my invention on the accompanying drawings of which Fig. 1 shows the invention used in joining two pipes; Fig. 2 shows it used in joining a pipe to a fitting; Fig. 3 shows a modification of the form of Fig. 1; Figs. 4 and 5 show two further modifications; and Fig. 6 shows the invention used to connect a pipe to a pipe intended originally for another type of joint.

Referring first to Fig. 1, the two pipes to be joined are given the reference numerals 1 and 2 respectively. As stated above, these pipes are of considerable size and made of steel or other material that can be flanged. This flanging is shown at 3 and 4, and may be performed by any desired means. It will be noted that the flange 3 is frusto-conical in shape, while flange 4 is in the shape of a spherical segment with its center at 5. The size of the two flanges is such that flange 4 fits into flange 3 as shown, making contact with it along what would be a line if the surfaces were geometric cone and sphere, and what is in practice a narrow band or surface.

The outer surface of flange 3 is engaged by the correspondingly shaped surface 6 of the ring 7.

The outer surface of flange 4 has bearing against it a backing ring 8, the engaging surface being given the shape of a spherical segment to give the proper bearing surface. The outer surface 9 of ring 8 is preferably likewise given the shape of a spherical segment, as shown, and engages the correspondingly shaped surface 10 of ring 11.

Rings 7 and 11 are clamped together by means of bolts 12, of which the necessary number will be used in any case suitably distributed around the pipes, only two appearing in the drawing.

It will be seen that the pipe 2 need not be in exact alinement with pipe 1. The position indicated in dotted lines at 13 may, for example, be given to pipe 2, the flanges 3 and 4 being moved slightly relatively to each other. Additional motion becomes possible by a slight relative motion between ring 11 and backing ring 8. A slight variation from alinement, such as contemplated by this invention, often is extremely desirable, and is entirely impossible with joints of this type of known forms in which the flanges are perpendicular to the pipe axis, and the contacting surfaces are plane.

One advantage in the use of joints such as described in a pipe line made up of a number of pipes and extending between two fixed points is that the pipe lengths do not need to be so exactly correct as if the usual joints with parallel faces were used. In the latter case only an extremely small variation is permissible, while a slightly excessive length with the improved joints merely necessitates that two adjacent pipes in the line shall form a slight angle with the pipe line. This is entirely feasible with my invention and entails no difficulty in obtaining tight joints.

In Fig. 2, flange 4, and rings 8 and 11 are just like those in Fig. 1, but instead of flange 3 and ring 7 there is shown the flange 7ª which may be part of a steam nozzle or other fixture.

The flange 3 is shown in the drawing and described in the above as being of a frustoconical form, and this is the form I preferably give it; but if desired it may be given the form of a spherical segment, with the same center as flange 4. This form is shown in Fig. 3. Preferably a gasket 14 is in this case inserted between the two flanges. This figure also illustrates how the backing ring and the clamping rings may be arranged so they can be put on and taken off the pipe after flanging. Ring 11ª is integral and has a stepped opening large enough to let flange 4 pass through. A split ring 11ᵇ, with complementary stepping is placed into the said stepped opening and bears against the split backing ring 8ª. I lay no claim to this detail and do not think it necessary to illustrate it further.

The modification of Fig. 4 consists in making the ring 11ᶜ integral with the backing ring 8. This may at times be desirable and results in a somewhat simpler form, but at a slight sacrifice of flexibility of the structure. The form does not appear to call for any additional description.

In Fig. 5 a variation from Fig. 1 is shown, which consists in making the backing ring 8 integral with the flange 4, resulting in a heavy ring 8ᵇ. The surfaces of this ring which engage the flange 3 and the ring 11 have the shape of spherical segments. From what has been said the function of this form will be understood.

In Fig. 6 there is shown a form of the invention which makes it feasible to utilize the invention in connection with a pipe provided with a flange of the known form, i. e. plane and at right angles to the pipe axis. This modification may be required to connect pipes with flanges for my improved joint to a pipe in an existing installation.

The flange 16 is such a plane flange at right angles to the pipe axis, and the flange 4ᵃ is one of my improved pipe joints, corresponding to 4 of Fig. 1. To make it possible to connect the two I insert the auxiliary ring 17 between the two. This ring has a plane surface adjacent to flange 16 and a frusto-conical one engaging flange 4ᵃ. Usually it will be advisable to place a package 18 between the two flat surfaces. Rings 7ᵃ and 11ᵈ corresponding to 7 and 11 of Fig. 1, are clamped together by bolts 12ᵃ and force together the surfaces forming the joints. The same degree of flexibility is thus obtained at the junction between the two pipes as if they were both provided directly with flanges of the required form.

What I claim is:—

1. In a pipe joint of the class described, the combination of a pipe having a frusto-conical flange, a second pipe having a flange in the form of a spherical segment engaging the flange of the first pipe, a backing ring engaging the second flange and having the form of a spherical segment opposite the flange, rings engaging the outer surface of the first flange and the spherical surface of the backing ring, and means to draw said rings toward each other.

2. In a pipe joint of the class described the combination of two pipes provided with a flange each, at least one of the flanges having the shape of a spherical segment, and means to keep said flanges in engagement comprising a backing ring engaging the spherical flange and two rings engaging the other flange and the backing ring respectively, the engaging surfaces between the backing ring and its ring being spherical segments.

BENJAMIN BROIDO.